(12) United States Patent
Kristiansen (10) Patent No.: US 10,970,982 B2
(45) Date of Patent: Apr. 6, 2021

(54) VIDEO SURVEILLANCE APPARATUS AND METHOD

(71) Applicant: CANON KABUSHIKI KAISHA, Tokyo (JP)

(72) Inventor: Morten Engel Kristiansen, Smørum (DK)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/330,734

(22) PCT Filed: Sep. 8, 2017

(86) PCT No.: PCT/EP2017/072646
§ 371 (c)(1),
(2) Date: Mar. 5, 2019

(87) PCT Pub. No.: WO2018/046692
PCT Pub. Date: Mar. 15, 2018

(65) Prior Publication Data
US 2019/0197850 A1   Jun. 27, 2019

(30) Foreign Application Priority Data
Sep. 9, 2016 (GB) ...................... 1615389

(51) Int. Cl.
*G08B 13/196* (2006.01)
*G06K 9/00* (2006.01)
*H04N 7/18* (2006.01)

(52) U.S. Cl.
CPC ... *G08B 13/19682* (2013.01); *G06K 9/00771* (2013.01); *G08B 13/196* (2013.01); *G08B 13/19608* (2013.01); *G08B 13/19645* (2013.01); *G08B 13/19652* (2013.01); *H04N 7/18* (2013.01)

(58) Field of Classification Search
CPC ............ G08B 13/19682; G08B 13/196; G08B 13/19608; G08B 13/19645; G08B 13/19652; G08B 13/194; G06K 9/00771; H04N 7/18
See application file for complete search history.

(56) References Cited

U.S. PATENT DOCUMENTS

| | | | |
|---|---|---|---|
| 5,343,284 A | 8/1994 | Keeler et al. | |
| 7,006,950 B1 | 2/2006 | Greiffenhagen et al. | |
| 8,836,730 B1* | 9/2014 | Desai | G09G 5/00 345/660 |
| 2005/0278088 A1* | 12/2005 | Thorner | B60Q 9/005 701/28 |
| 2016/0042621 A1* | 2/2016 | Hogg | G06K 9/00771 348/155 |
| 2016/0187477 A1* | 6/2016 | Wang | G08B 13/19617 342/52 |

* cited by examiner

*Primary Examiner* — Nam D Pham
(74) *Attorney, Agent, or Firm* — Canon U.S.A., Inc. IP Division (57) ABSTRACT

A video surveillance apparatus determines a field of view of a video surveillance camera (110) having a sensor (120) mounted thereon. A distance measuring means is configured to obtain a plurality of distance measurements based on data received from the sensor (120). A field of view determining means is configured to determine, based on the plurality of distance measurements, the field of view of the camera (110).

27 Claims, 12 Drawing Sheets

VIDEO SURVEILLANCE APPARATUS AND METHOD

The application is the National Phase application of PCT Application No. PCT/EP2017/072646, filed on Sep. 8, 2017 and titled "Video surveillance apparatus and method". This application claims the benefit under 35 U.S.C. 119(a)-(d) of United Kingdom Patent Application No. 1615389.2, filed on Sep. 9, 2016 and titled "Surveillance apparatus and surveillance method". The above cited patent application is incorporated herein by reference in its entirety.

TECHNICAL FIELD

The present invention relates to video surveillance, in particular providing a video surveillance apparatus and method for the determination of a field of view of a video surveillance camera.

BACKGROUND

Video surveillance is typically used to observe a selected region of space or a selected object using at least one video camera. This often serves to protect valuable assets, with the video surveillance apparatus being arranged to observe property and people.

Checking whether the video surveillance apparatus is expected to observe the selected object or the selected region of space can be performed by drawing a map of the environment that is to include the video camera. The field of view of the camera is inferred from assumptions of the image that could be captured by the camera. Plotting the inferred field of view on a map, the best location for the camera can be chosen for the observation of the selected object or the selected region of space.

However, the process of drawing the map and the assumption of the field of view is time consuming and vulnerable to errors, particularly for the surveillance of objects or regions of space that are complicated. For example, if the selected object or selected region of space is particularly large or includes many obstacles, then it is difficult to accurately determine the field of view that would be observed. A more efficient technique is required for assessing the field of view of a video surveillance camera.

Also, the environment may be dynamic and include moveable obstacles such as vehicles or people, and therefore the field of view of each camera may change over time if objects move to block parts of the field of view of the camera.

SUMMARY

According to a first aspect there is provided a video surveillance apparatus according to claim 1.

Preferred features of the invention are set out in claims 2 to 12.

According to a second aspect there is provided a method according to claim 13.

A third aspect provides a computer program that, when implemented by a computer, causes the computer to perform a method according to the second aspect.

A fourth aspect provides a computer-readable medium storing a computer program according to the third aspect.

Thus, the present invention allows the field of view of a video surveillance camera to be determined based on measured data rather than theoretical calculations. This provides a more accurate determination of the field of view, and enables the system to monitor and determine the field of view periodically and take into account objects which move to obscure the camera's view.

The field of view of the camera, or of a plurality of cameras, can be displayed on a display to be viewed by an operator, for example as a plan view. This enables an operator to identify areas or objects which are not within the field of view of any camera, so that the operator can make adjustments. For example, if there are a plurality of cameras, and one camera has its field of view obscured by an object, the operator may adjust the angle of another camera so that the "blind spot" is covered by the other camera.

The operator may know which areas are important, but also automatic alerts can be set up to alert the operator if particular target areas or objects become out of the field of view of the camera(s).

The sensor may be of a type which can measure the distance between the sensor and the captured object even if the target is not sufficiently illuminated for the camera to capture the target. For example, an infra red sensor. Advantageously, the determination of the field of view and the assessment of whether a target object is expected to be observed can be performed even if the lighting conditions prevent the observation of the target object at that time.

The video surveillance apparatus may turn on a light if the target is not illuminated. Advantageously, turning on the light increases the sensitivity of the camera, so that the target can be observed more clearly. If an alert has been raised because the target is not within the field of view of the camera because an object has obscured the target, turning on the light allows the camera to observe the object which is blocking its field of view and obscuring the target.

The video surveillance apparatus may start the recording of image data if a captured object does obscure the target. In this case, the image data is only recorded when necessary to observe a change in the target, which saves the amount of memory and resources that are required.

BRIEF DESCRIPTION OF THE DRAWINGS

Embodiments will now be described, by way of example only, with reference to the accompanying drawings, in which:

FIGS. 4A and 4B are flow charts showing examples of how the determination of whether the target is within the field of view of a camera can be implemented by a video surveillance system; FIG. 4A shows how a user can be notified of whether the target object can be viewed by the video surveillance camera; FIG. 4B shows how an assessment can be made of whether to record the images captured by the camera;

DETAILED DESCRIPTION

Various exemplary embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1A:
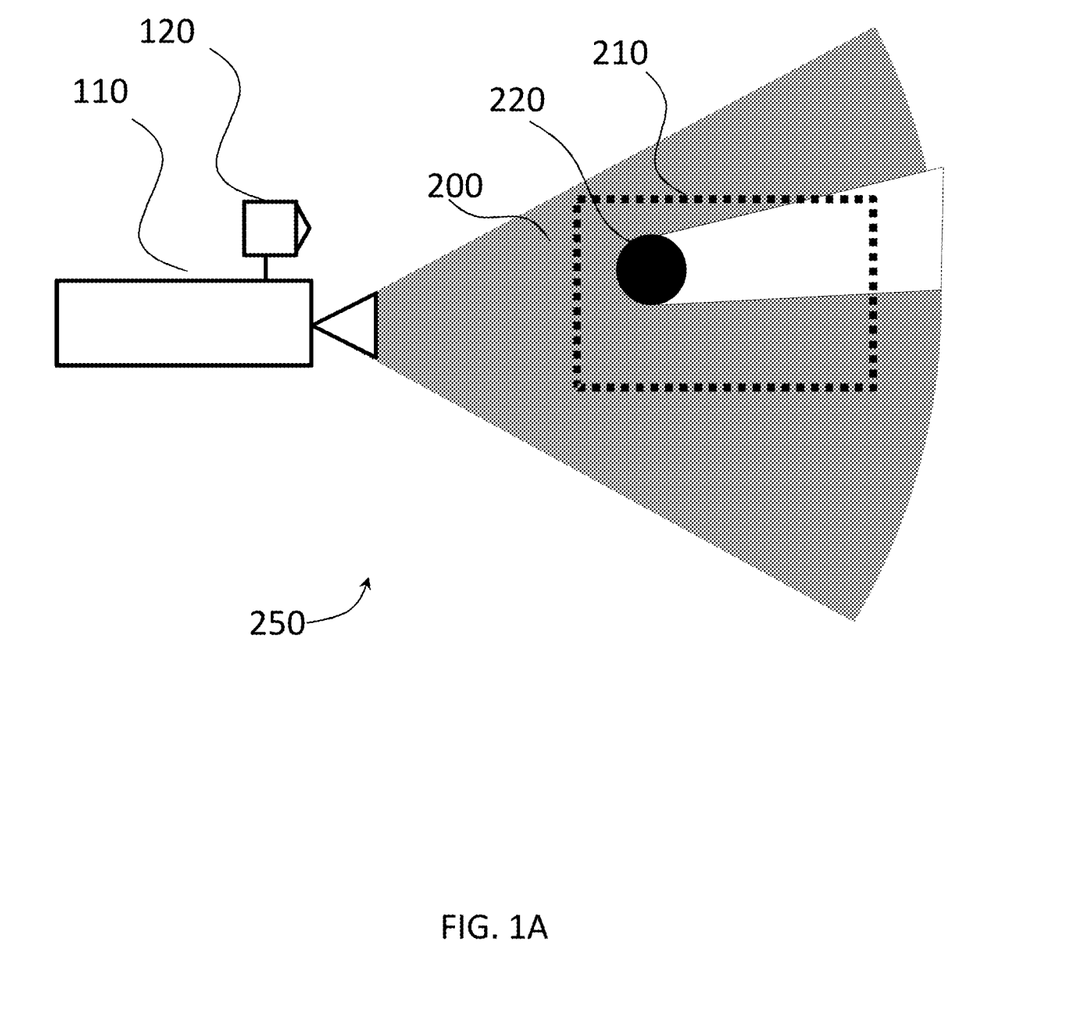
FIGS. 1A and 1B provide a schematic views of a field of view of a video surveillance camera.
Figure 1B:
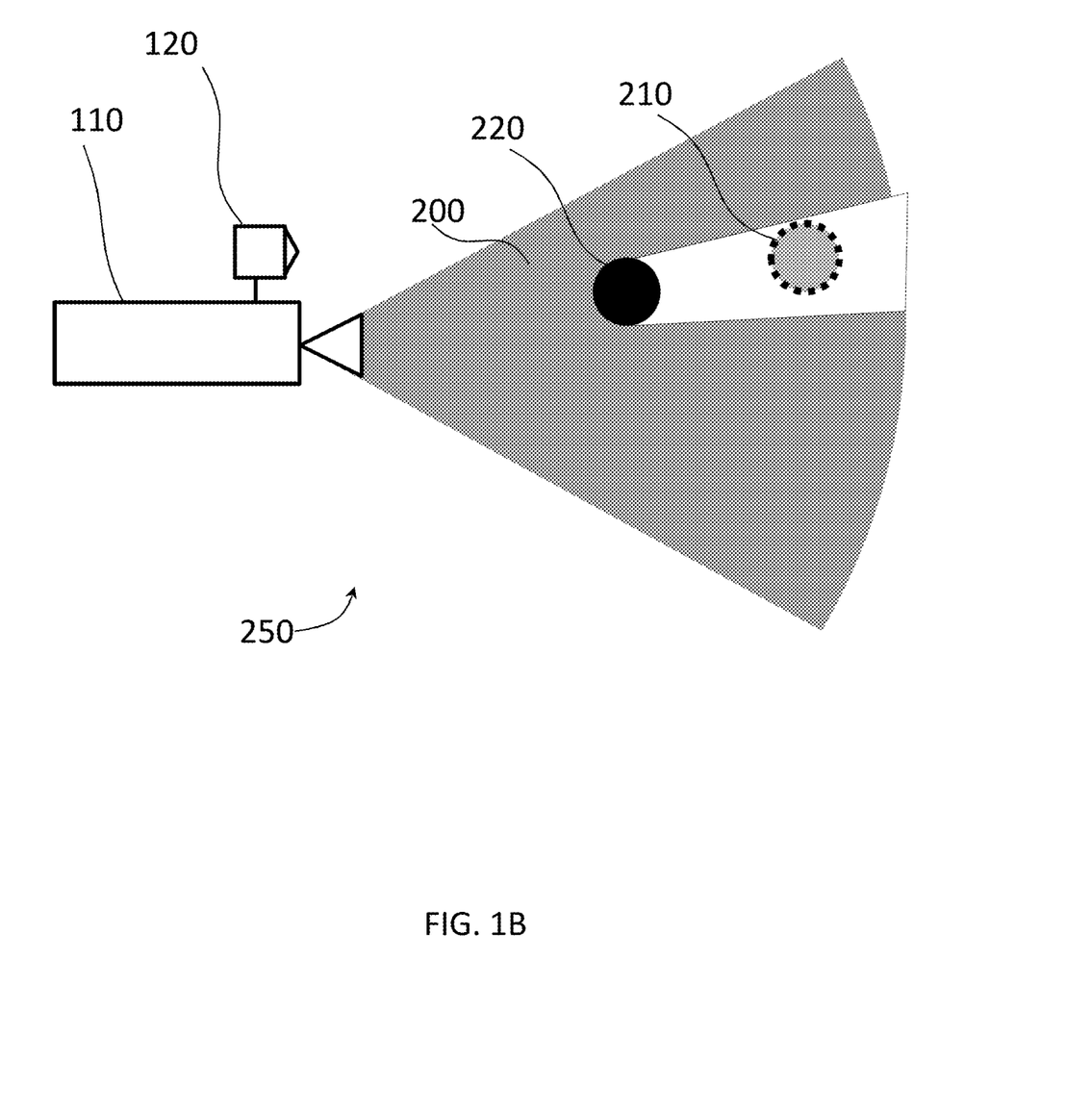

FIGS. 1A and 1B illustrate a field of view 200 of a video surveillance camera 110. The field of view 200 includes all of the features that can be captured by the camera 110. The field of view 200 includes a captured object 220. The camera 110 can view a target 210, provided that it is within the field of view 200. Examples of possible targets include a region of space 210 (FIG. 1A) and an object (FIG. 1B). For the examples shown in FIGS. 1A and 1B, the field of view 200 does not include the target 210 because at least a part of the target 210 is obscured by the captured object 220.

Accordingly, an environment 250 in which the camera 110 is to be placed includes the field of view 200. The camera 110 is arranged so that the field of view 200 can be determined based upon data corresponding to the environment 250, which is obtained by a sensor 120 mounted on the camera 110. Advantageously, the environment 250 is monitored in real time, so that an up to date assessment of the field of view 200 can be made to determine whether or not the target 210 has become obscured.

FIG. 1A shows an example in which a part of the target 210, which in this case is a region, is obscured by the captured object 220. FIG. 1B shows an example in which the target 210 is an object which is obscured by the captured object 220. The target 210 may be a valuable item, or a region of space within which any activity is to be monitored. The captured object 220 is an obstacle, for example a person or a vehicle. Examples of such a target region of space 210 include a road or a car park, for which the detection of a captured object 220 would obscure this region of space, thus indicating the presence of a vehicle.

The examples shown in FIGS. 1A and 1B describe an arrangement for which a single target 210 is obscured by a single captured object 220. However, a plurality of targets may need to be observed, with some of the targets being considered more valuable than others. The field of view may then provide the possibility of capturing some of the targets but not others. In this situation, each of the targets could be ranked by a level of importance, so that priority can be given to observing the targets that are considered most important.

FIGS. 1A and 1B are schematic diagrams representing a video surveillance camera 110 configured to view a three-dimensional field of view. The two-dimensional schematic shown could represent a view from above (plan view) or a view from the side. An assessment is made of whether the three-dimensional captured object 220 will obscure the view of any part of a three-dimensional target 210, which could be either a three-dimensional object or a three dimensional region of space.

Figure 2A:
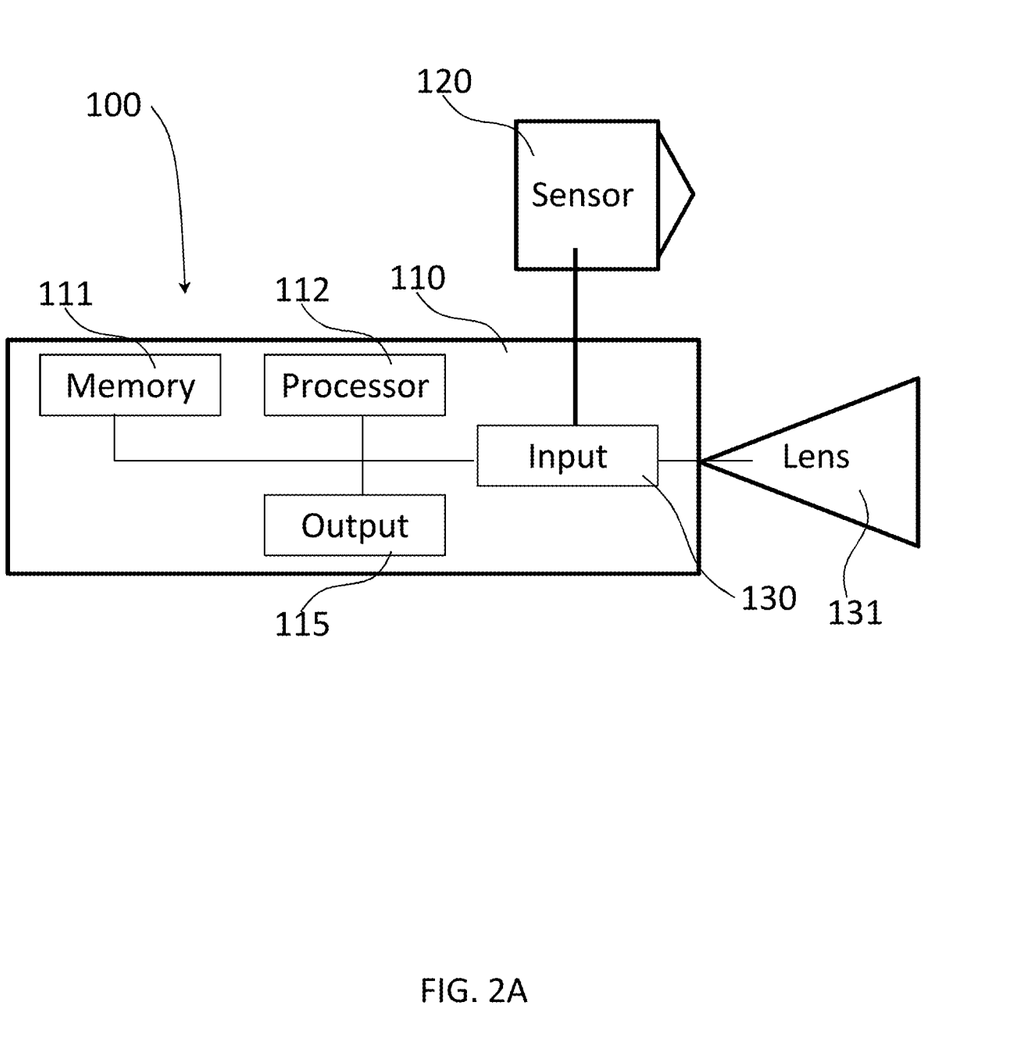
FIGS. 2A, 2B and 2C are block diagrams showing possible configurations of a video surveillance apparatus.
Figure 2B:
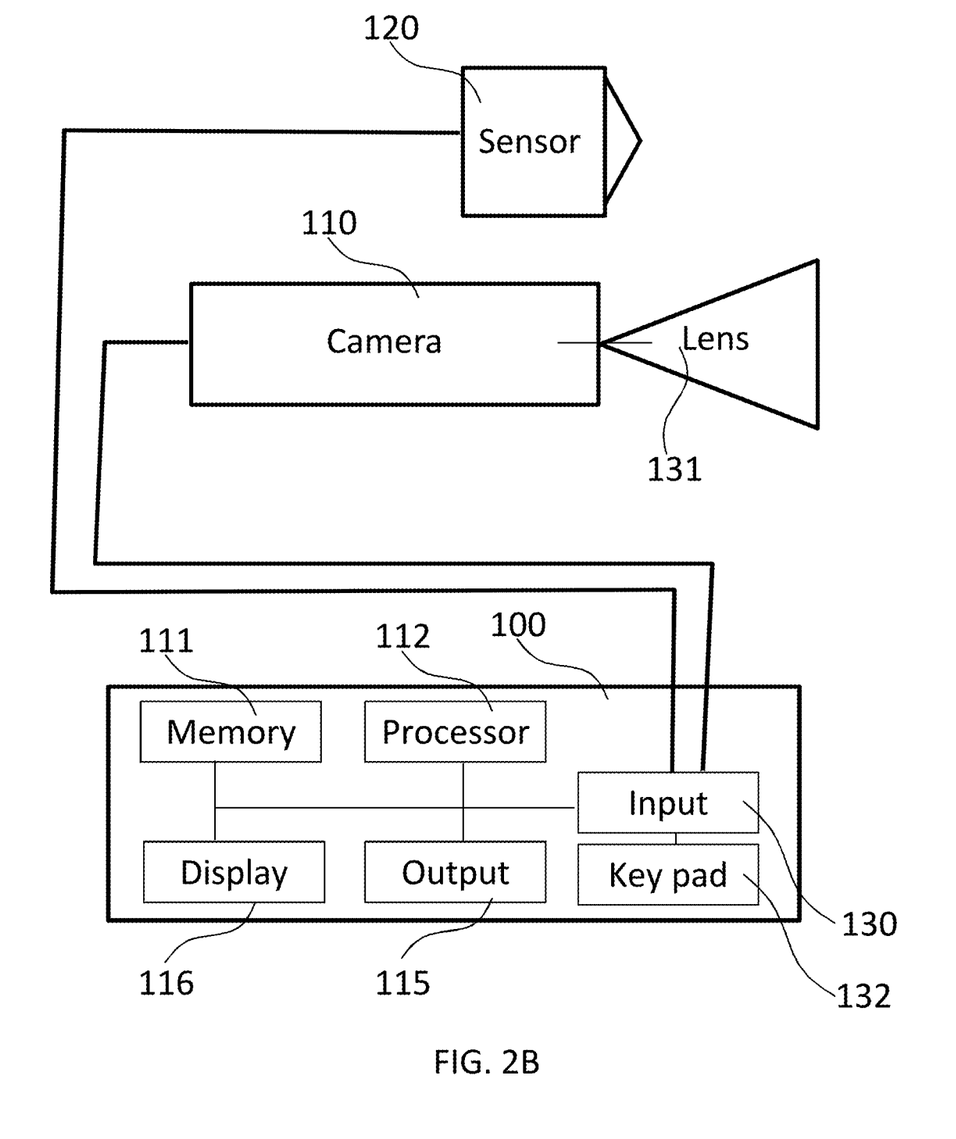
Figure 2C:
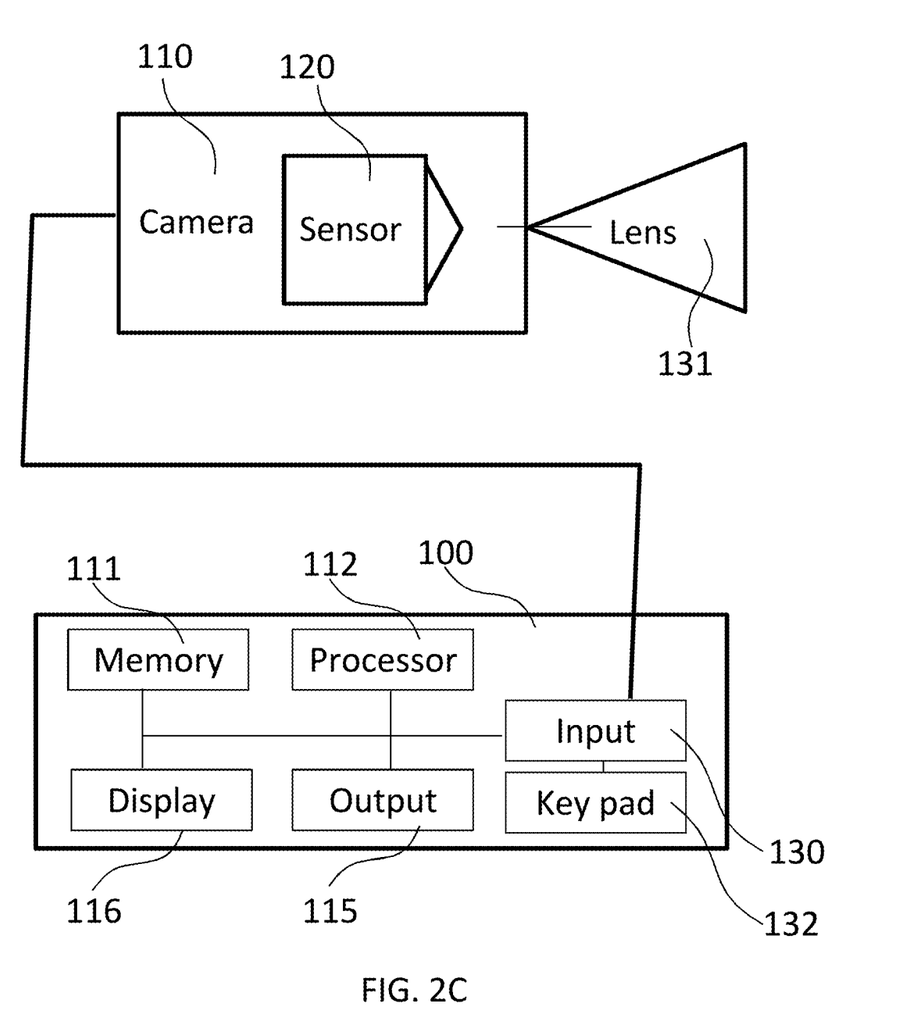

FIGS. 2A, 2B and 2C show examples of an arrangement for a video surveillance apparatus 100, a video surveillance camera 110 and a sensor 120.

The video surveillance apparatus may be incorporated wholly within the video surveillance camera 110, as shown in FIG. 1A. In this case, the processing to determine the field of view is carried out within the camera 110 itself. Alternatively, as shown in FIGS. 2B and 2C, the video surveillance apparatus may be a separate apparatus which receives data from the camera 110 and the sensor 120. It is also possible for part of the function of the video surveillance apparatus to be carried out within the camera and part to be carried out in an external apparatus.

In FIG. 2A, the camera 110 has a memory 111, which includes a non-volatile memory, such as a hard disk, for long term data storage and RAM for short term data storage. The camera 110 also has a processor 112 for controlling the operation of the camera 110. The camera 110 includes an input interface 130 which receives data from an image sensor which generates image data from light captured by a lens 131. A sensor 120 is mounted on the camera 110 and data from the sensor 120 is also received by the input interface 130. The camera 110 includes an output port 115 for outputting information to an external display.

The input interface 130 is used to input image data and data from the sensor 120 corresponding to the field of view 200, with information about the environment 250 being received by the camera from both the lens 131 and the sensor 120. The sensor 120 detects any obstacles in the field of view 200, including the captured object 220. The data from the sensor 120 is processed by a distance measuring means embodied in the processor 112, to obtain measurements of the distance between the sensor 120 and any object within the field of view 200. The distance measurements can then be used by a field of view determining means embodied in the processor 112, to determine the extent of the field of view 200. Data representing the field of view can be output via the output 115 to a display where it can be displayed to an operator, for example in a plan or map view.

Data defining the target 210 is stored in the memory 111. The data defining the target may include location and size information. The target is identified by the processor 112 extracting from the memory 111 location data of the target 210 that has been stored, in order to determine whether the target 210 is included in the field of view 200 determined from the distance measurements.

The data from the sensor 120 is used by the distance measuring means embodied in the processor 112 to obtain distance measurements which can be used to detect the presence of the captured object 220. The sensor 120 is sensitive to electromagnetic radiation. For the present example, the sensor detects radio waves or infra-red, and so detects objects without using visible light. Consequently, the distance measurement can be performed in total darkness.

Distance measurements are used by the processor 112 to establish whether the field of view 200 includes the target 210, and therefore it can be determined whether the captured object 220 obscures the target 210.

The data defining the field of view 200 can be used to map the field of view and data defining the field of view is output via the output port 115 to an external display which displays it to an operator. For the purposes of mapping the field of view, the extent of the field of view 200 (ie the distance from the camera 110 which can be viewed for practical purposes) may be limited dependent upon the resolution of the camera 110. Also, the maximum distance at which objects can be measured may be limited by the sensitivity of the sensor 120. Thus, the mapped or displayed field of view 200 is shown on the display as being restricted to a maximum distance from the surveillance apparatus 100.

The sensor 120 is arranged to periodically scan the environment 250, thus providing data from which the processor 112 can determine a plurality of distance measurements. The dependence of the distance measurements on the angle and position of the sensor 120 is used to determine the shape of the environment 250. The dependence of the distance measurements on time is used to determine changes of the environment 250. Accordingly, an assessment is made of whether the field of view 200 of the camera 110 contains the target 210, wherein the target is, for example, a region of space or an object. Advantageously, determining changes to the shape of the field of view 200 allows a determination to be made of whether a part of the target 210 has become obscured by a part of the captured object 220.

It is not necessary for the camera 110 to be present in order to determine an expected field of view 200. Alternatively, the sensor 120 could send data to the processor that could determine the expected field of view of the camera and determine whether the captured object 220 obscures the target 210. Thus, the sensor 120 can be used to determine whether the camera 110 would be expected to detect the target 210.

FIG. 2B provides an alternative arrangement for which the video surveillance apparatus 100 is a separate apparatus which receives data from the camera 110 and the sensor 120 and includes the processor 112 which includes the distance measuring means which performs the processing of the data from the sensor to obtain distance measurements and the field of view determining means which determines the field of view of the camera 110.

Therefore, the processing of the sensor data can be carried out in the camera as shown in FIG. 2A, or remotely by a separate surveillance apparatus, which may be a network video surveillance server. In this case, it is not necessary for the camera 110 and the sensor 120 to be connected to one another, since they can instead communicate independently with the server 150. Thus, the present invention could be implemented by fitting sensors to existing cameras, with the processing of data received from the sensors being carried out by software installed on the network video surveillance server.

In the case of a remote video surveillance apparatus 100 as shown in FIG. 2B, the video surveillance apparatus 100 can communicate with a plurality of video surveillance cameras and sensors, so that the surveillance apparatus 100 can determine the fields of view of a plurality of cameras, each having a sensor mounted thereon, and generate a single display showing the fields of view of the plurality of cameras. Thus, an operator can view the fields of view of the plurality of cameras and see if certain target areas or objects are not covered, or if there are "blind spots" amongst the fields of view of the plurality of cameras. Alternatively, automatic alerts can be set up to alert an operator if a particular target object or area is not within the field of view of any of the cameras. This can allow a user to remotely adjust, for example, the viewing angle of one of the cameras so that the target area or object is covered, or it can trigger an alarm alerting security of the need to send personnel to investigate.

FIG. 2C shows an alternative arrangement in which the camera 110 is arranged to include the sensor 120, with the video surveillance apparatus 100 provided as an external device, as in FIG. 2B. Advantageously, the field of view is the same for both the camera and the sensor, although this is not essential because if they are different then the field of view of the camera can be inferred using well-known principles of trigonometry and geometry. Thus, integrating the sensor 120 as part of the camera 110 improves the reliability of the determination of whether the target 210 is obscured by the captured object 220, and the ease of determining the field of view of the camera 110. FIG. 2C shows the camera 110 in remote communication with the video surveillance apparatus 100, although one or more of the features of the video surveillance apparatus 100 can be integrated as part of the camera 110. For example, the calculating of distance measurements from the sensor data could be carried out in the camera 110, and the distance data sent to an external apparatus for determining the field of view and mapping the field of view.

Figure 3:
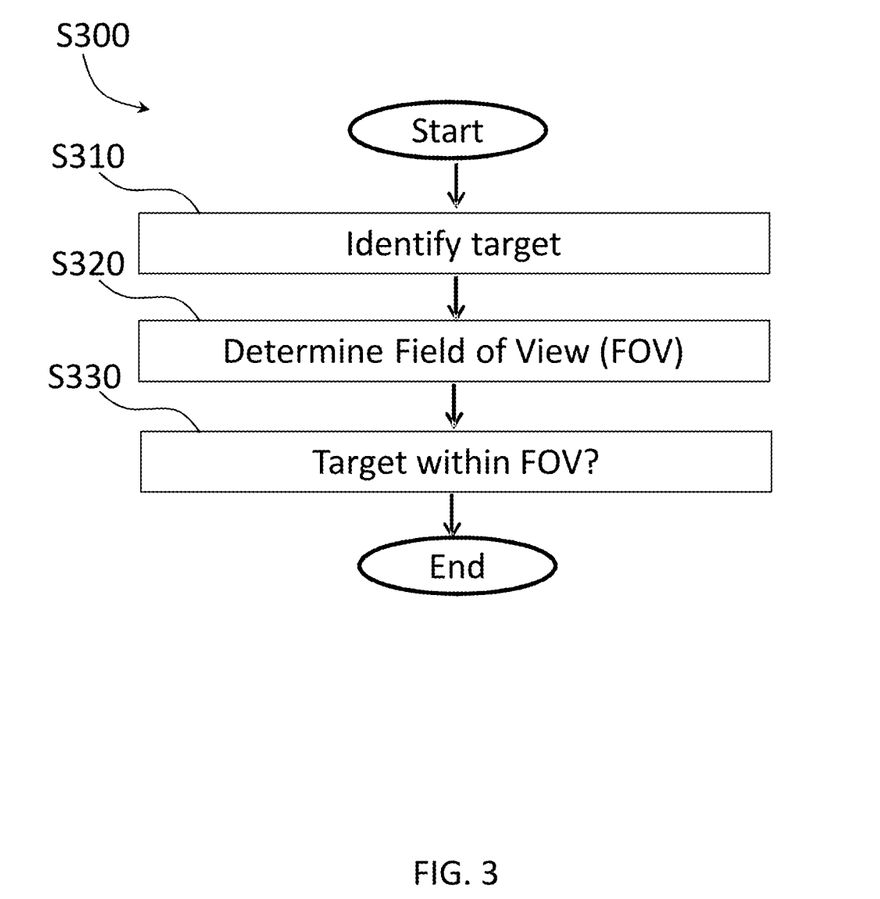
FIG. 3 is a flow chart showing how to determine whether a target is within the field of view of a video surveillance camera.

FIG. 3 provides a method S300 used to determine whether it would be possible for the target 210 to be observed by the camera 110. The target 210 is identified in step S310 by the processor 112 retrieving from the memory 111 details of the target 210 that is to be detected.

Identification in step S310 of the target 210 is achieved by retrieving stored information from the memory 111. The target 210 was previously stored in the memory 111 by the user.

In step S320 the field of view of the camera is determined by receiving data from the sensor 120 and calculating a plurality of distance measurements which are distances between the sensor 120 and objects in the environment including the captured object 220. If necessary, well-known methods of trigonometry can be implemented by the processor 112 to calculate the distance between the camera 110 and the captured object 220, based upon the measured distance between the sensor 120 and the captured object 220. Furthermore, based on the location of the camera, well-known methods of geometry can be used to present the field of view of the camera 110 to the user as a plan view.

Once the field of view of the camera 110 has been determined, based on the location of the target 210, it can be determined whether the target 210 is located within the field of view of the camera 110. Thus, in step S330, it can be determined whether the captured object 220 would obscure the target 210 based on a calculated field of view of the camera 110 based on the distance measurements performed based on data collected by the sensor 120.

The present invention is useful for assessing whether the captured object 220 obscures the target 210. Alternatively, the invention can be used to perform an assessment of what the camera 110 is expected to observe in order to set cameras up in the most convenient location for observing the target 210.

Figure 4A:
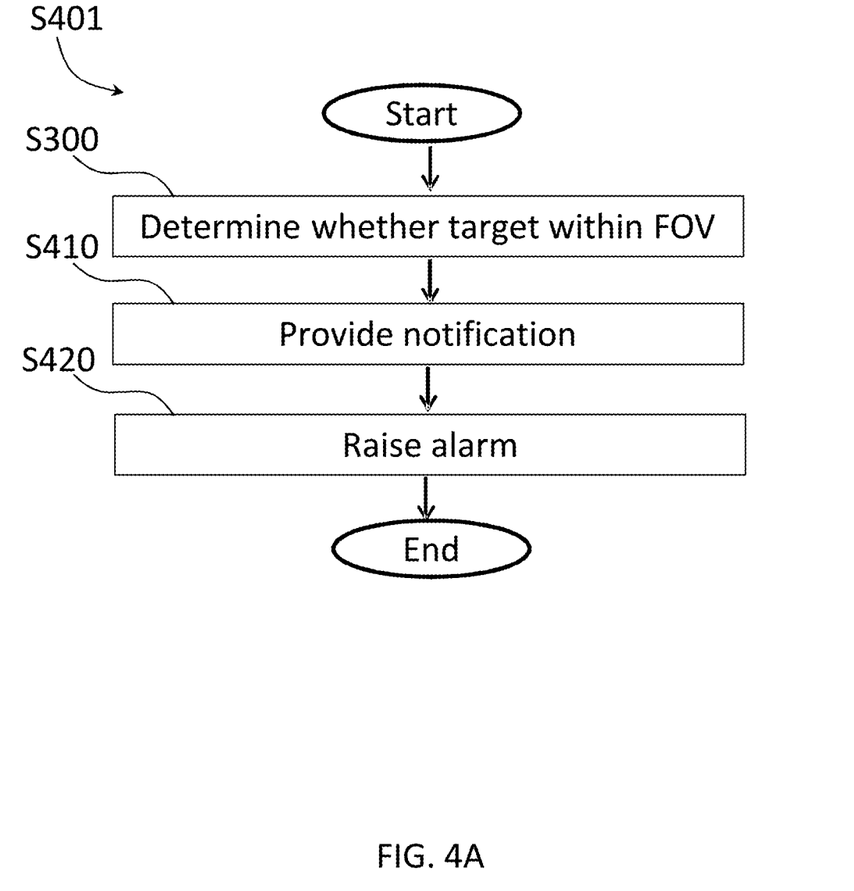
Figure 4B:
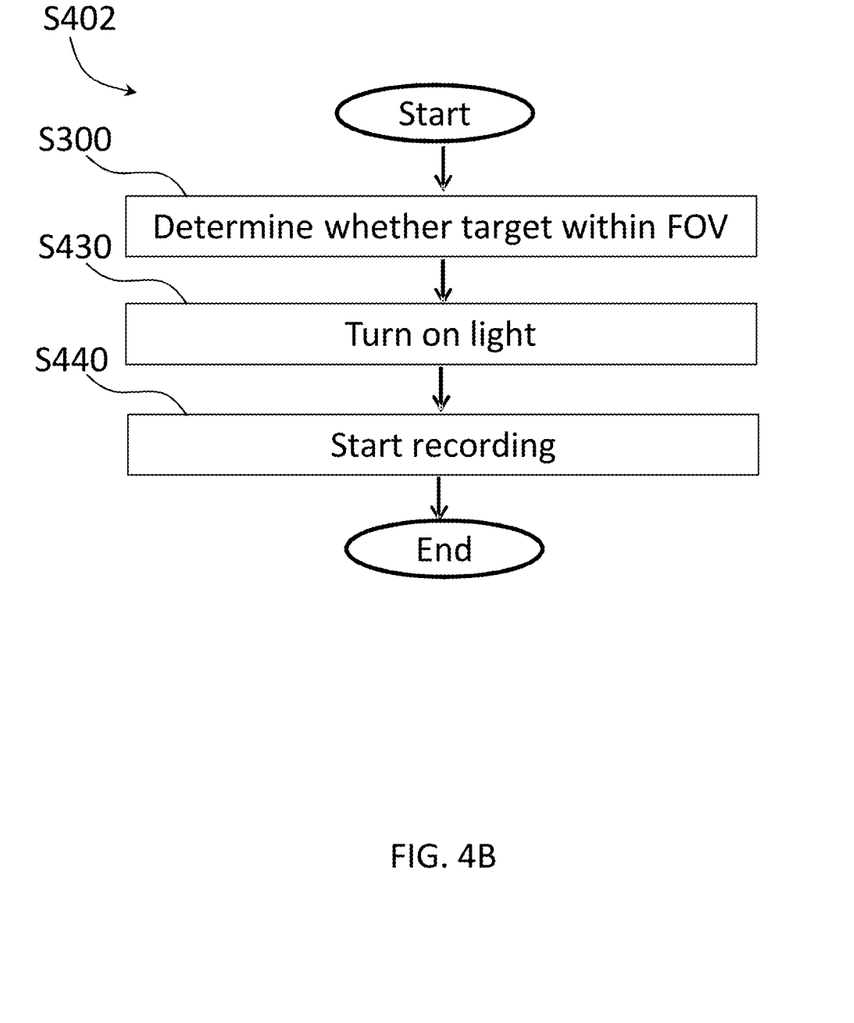
Figure 5:
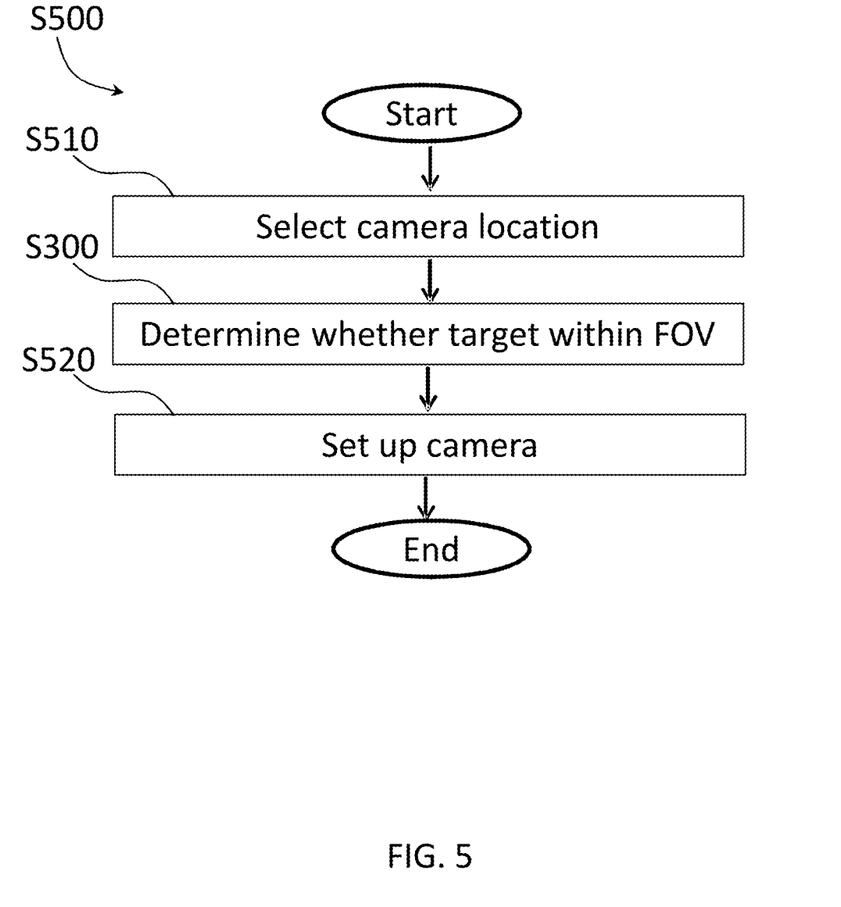
FIG. 5 is a flow chart showing how the user can determine a suitable location for the setting up of one or more video surveillance cameras.

FIGS. 4A, 4B and 5 identify possible applications for the technique provided by FIG. 3. FIGS. 4A and 4B provide application for a camera that has already been installed, whereas FIG. 5 provides an application for installing a camera.

FIG. 4A provides a method S401 that is used to notify a user of whether it would be possible for the target 210 to be observed by the camera 110.

A determination is made corresponding to step S300 of whether the target 210 is within the field of view of the camera 110, in accordance with the method described in FIG. 3.

A notification is provided in step S410 of whether the target 210 is within the field of view or obscured. Accordingly, the user is notified of whether the field of view 200 contains the target 210.

An alarm is raised S420 if it is determined that the target 210 can no longer be observed because it is not within the field of view of the camera as it has become obscured. The alarm will alert security that the target 210 is not visible, so that necessary action can be taken. If there are multiple cameras, step S300 may be carried out for each camera, and an alarm only raised if the target 210 is not in the field of view of any of the cameras ie if the target is still within the field of view of at least one camera, the alarm is not triggered.

Additional security measures can be implemented, such as locking doors, so that the region of space that is being monitored can be protected. Consequently, the target 210 can be protected without the need for doors to be locked manually.

FIG. 4B illustrates a technique for determining whether to record images captured by the video surveillance system. The steps provided by FIG. 4B can be performed instead of or as well as the steps provided by FIG. 4A. An assessment is performed of whether the target is included in the field of view S300 in accordance with the method provided by FIG. 3. If a light is available, as part of the camera or separately, then a determination can be made of whether the field of view 200 is illuminated sufficiently. If necessary, a light is turned on S430, although this feature is not essential. If the target is obscured, then the video surveillance system starts recording the imaging data captured by the cameras. It is advantageous to start the recording once a determination has been made of whether the target is obscured, because this prevents the unnecessary recording of data. Accordingly, a technique is provided for reducing the quantity of data to be recorded, while also reducing the energy required to power the cameras.

FIG. 5 provides a method S500 for setting up a camera based upon whether the target 210 is within the field of view of the camera 110.

Selection of the camera location in step S510 is performed, so that it can be assessed whether the camera location would be suitable.

A determination is made corresponding to step S300 of whether the target 210 is within the field of view of the camera, in accordance with the method described in FIG. 3.

The camera is set up in step S520 at an appropriate camera location, so that the target 210 is within its field of view.

Figure 6A:
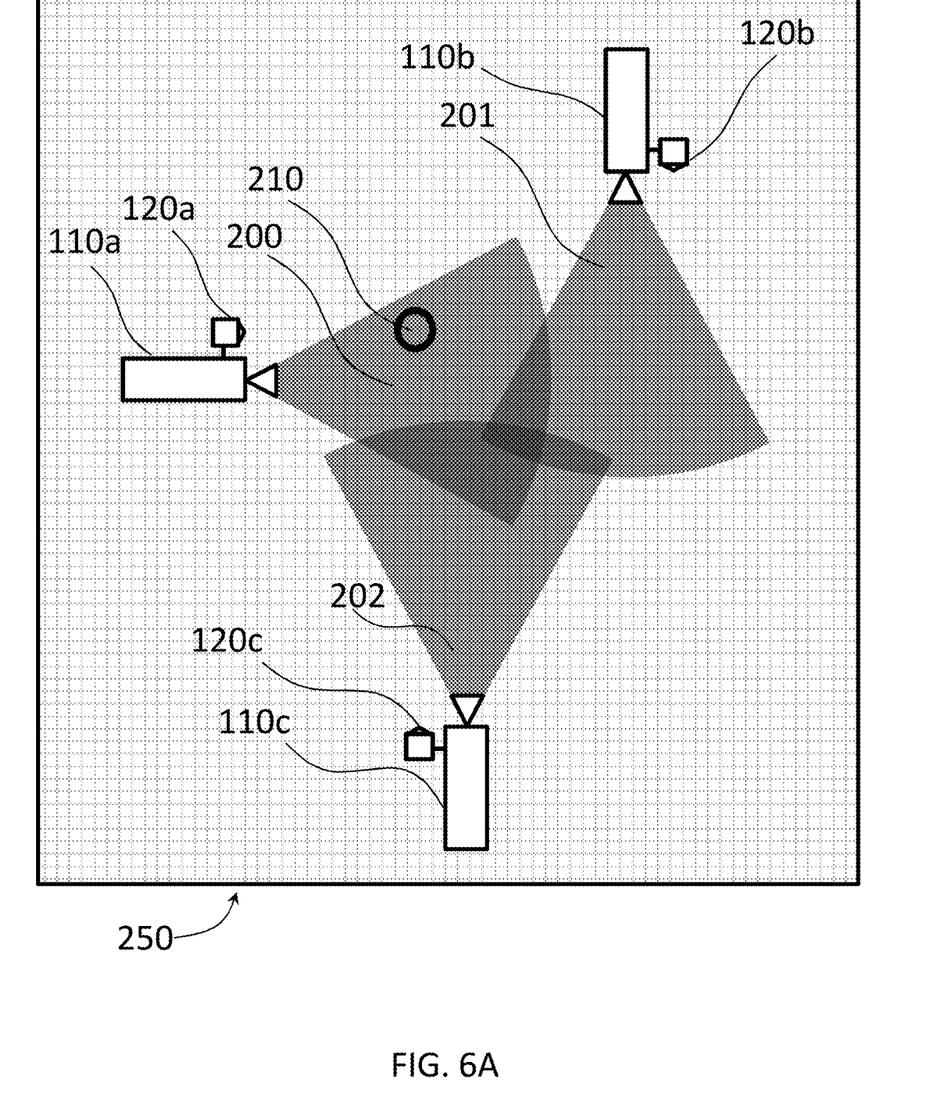
FIGS. 6A and 6B are schematic diagrams showing how it is assessed whether a target area or object is within the fields of view of multiple video surveillance cameras.
Figure 6B:
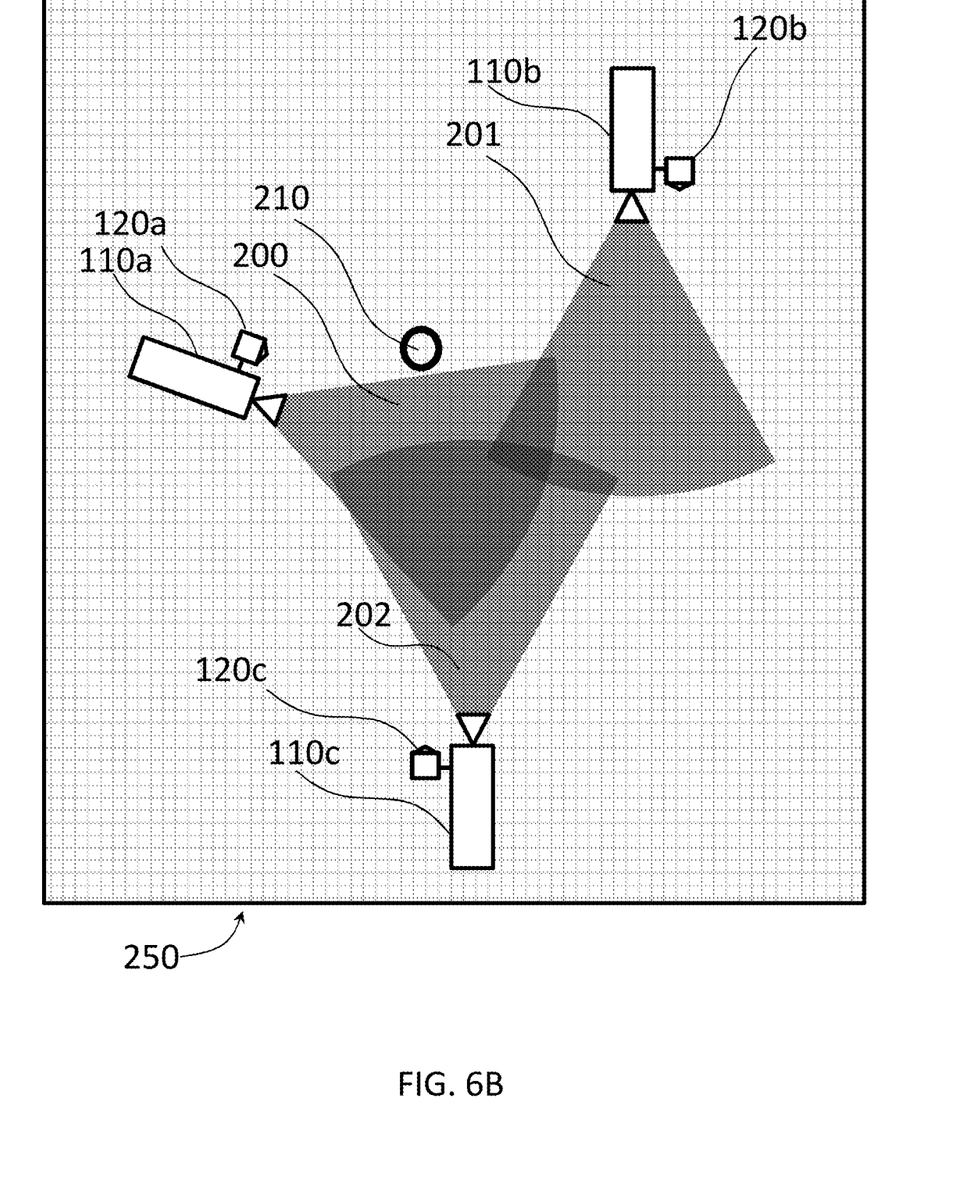

FIGS. 6A and 6B provide examples of how the techniques described in FIGS. 3, 4A, 4B and 5 could be implemented in an environment 250 with multiple cameras 110a, 110b, 110c.

A plan view or map is presented to the user showing an environment 250 that is to be observed by a plurality of video cameras 110a, 110b, 110c. Each of the cameras 110a, 110b, 110c has a sensor 120a, 120b, 120c mounted thereon, and each of the cameras 110a, 110b, 110c is configured to observe a field of view 200, 201, 202.

The map can be used in accordance with the method of FIG. 4 to provide a notification to the user S410 based upon the fields of view 200-202 of the plurality of cameras 110a, 110b, 110c, with an alarm being raised if the target is not within the field of view of at least one of the cameras 110a, 110b, 110c.

Alternatively, the map can be used in accordance with FIG. 5 so that a prediction can be made of the expected fields of view 200-202 of the cameras 110a, 110b, 110c, so that it can be determined how the cameras 110a, 110b, 110c should be distributed, or the angles of the cameras 110a, 110b, 110c can be adjusted to ensure that the target 210 is covered.

As shown in FIG. 6A, it is possible to observe the target 210 because the field of view 200 of camera 110a includes the target 210. However, in FIG. 6B, it is not possible to observe the target 210 because there is no field of view 200-202 that includes the target 210.

If it is possible to observe the target 210, as shown in FIG. 6A, FIG. 4A provides that an alarm would not be raised, FIG. 4B provides that a determination would be made of whether the video data captured by the camera would be stored in a memory, and FIG. 5 provides that this would be a suitable configuration for setting up the cameras.

However, if it is not possible to observe the target 210, as shown in FIG. 6B, FIG. 4 provides that an alarm would be raised, and FIG. 5 provides that this would not be a suitable configuration for setting up the cameras.

For the example shown in FIG. 6B, camera 110a has turned away, causing the target 210 to be no longer observed. This would provide the user with the opportunity to return the camera 110a to its previous direction for which it was possible to observe the target 210.

If the camera 110 is configured to move periodically according to a pan tilt zoom functionality so that the field of view of the camera changes periodically, it may be considered sufficient for the target 210 to be observed periodically, eg not over the entire panning period. In this case, a notification would be provided to the user in step S410 without it being necessary to raise an alarm in step S420. Accordingly, the user is presented with a notification that the target 210 can be observed some of the time. In this situation, it would be possible to periodically perform the assessment of whether the target 210 is obscured some of the time, with the alarm only being raised if a time has elapsed since the target 210 was last observed.

In addition to the arrangement shown in FIG. 6B for which the camera 110a has turned away, an alternative reason for the failure to observe the target would be that one of the cameras has been switched off. Accordingly, a determination can be made of whether the target 210 can be observed based upon whether the camera is turned on or turned off. Consequently, if it is not possible for the target 210 to be observed due to the camera being switched off, then an alarm is raised in accordance with step S420 of FIG. 4A and the camera is switched on and starts recording in accordance with step S440 of FIG. 4B.

This disclosure has focussed on a single target 210, although a plurality of targets could be monitored by providing a notification of which of the targets are expected to be captured by the camera or cameras. In this situation, each of the targets could be ranked by a level of importance, so that priority can be given to observing the targets that are considered most important.

Figure 7:
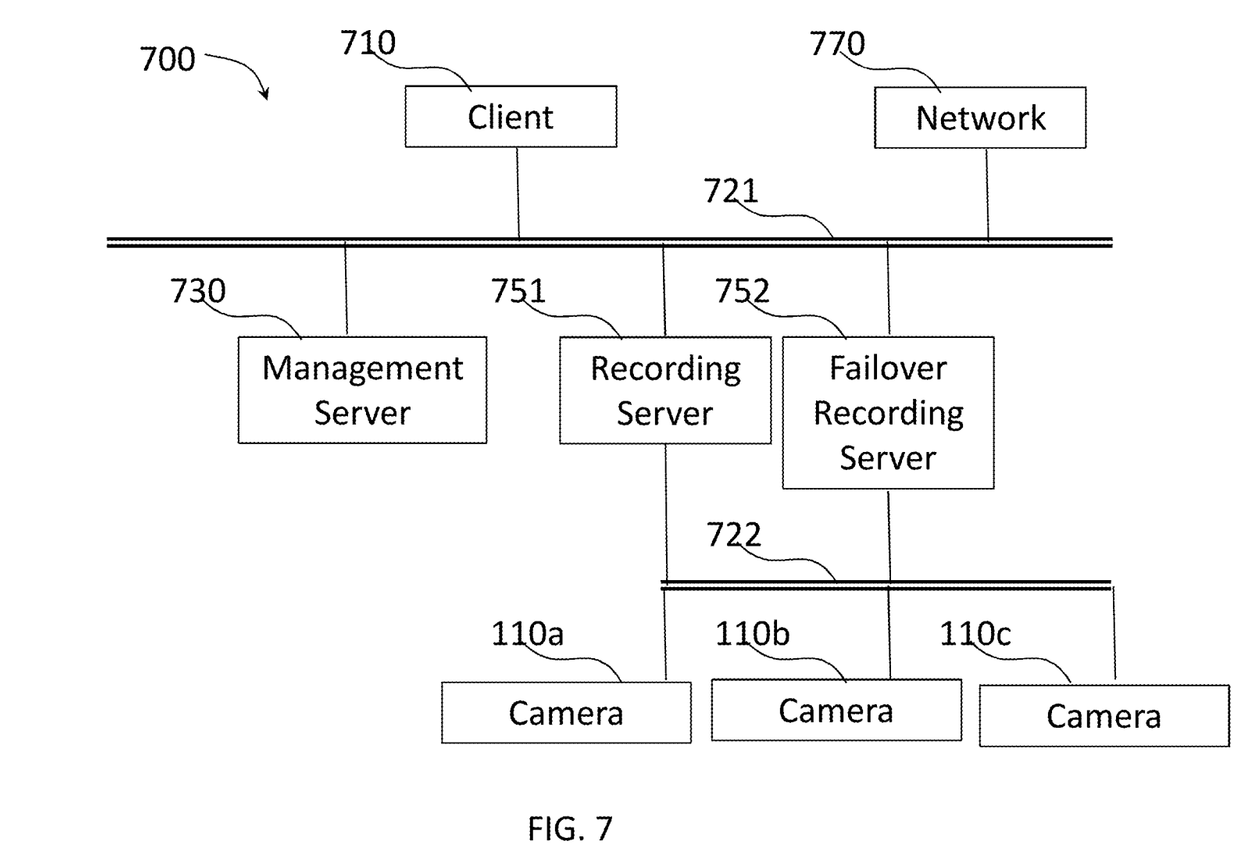
FIG. 7 is a block diagram showing a possible system architecture that includes a plurality of cameras.

FIG. 7 provides an example of the system architecture 700 into which one or more cameras 110a, 110b, 110c can be configured. A client 710 is provided for use by a security guard or other user in order to monitor or review the output of a plurality of video surveillance cameras 110a, 110b, 110c which are arranged around the property being surveyed. The client 710 is configured to communicate via a network/bus 721 with a management server 730, a plurality of recording servers 751, 752, and the cameras 110a, 110b, 110c. The recording servers 751, 752, communicate with the cameras 110a, 110b, 110c via a network/bus 722. The video surveillance system 700 can input and output data via a gateway 770 to an external network. The plurality of recording servers includes a recording server 751 and a failover recording server 752.

The client 710 includes a display for displaying an interface for interacting with video management software on the management server 730 in order to view images from the cameras 110a, 110b, 110c or to view stored video footage, which is stored on the recording server 751. The recording server 751 is the primary server for storing video data received from the cameras 110a, 110b, 110c. The management server 730 controls the transmission of the video data from the recording server 751 to the client 710 in accordance with instructions received from the user via the client 710. The failover recording server 752 is a backup server that stores video data from the cameras 110a, 110b, 110c in a case that the recording server 751 fails. The management server 730 controls the transfer of data between the cameras 110a, 110b, 110c and the servers 751, 752. In this embodiment, the recording server 751 comprises the distance measuring means and receives the data from the sensors 120a, 120b, 120c, mounted on the cameras 110a, 110b, 110c, and carries out the processing of the sensor data to obtain the distance measurements. The management server 730 comprises the field of view determining means and determines the field of view of each of the cameras 110a, 110b, 110c based on the distance measurements, and provides field of view data to the client 710 which displays the field of view on the display, for example as a plan view.

Typically, the management server 730 and recording server 751 are on separate servers, as shown in FIG. 7, but if the management server 730 is powerful enough or a small number of cameras 110a, 110b, 110c are used, the recording server 751 could be installed on the same server as the management server 730, which therefore includes both the distance measuring means and the field of view determining means. Although FIG. 7 shows a failover recording server 752, this is not essential. However, advantageously, if uninterrupted video operation is needed, the failover recording server 752 can be added as a backup.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

The invention claimed is:

1. A video surveillance apparatus comprising:
   an identifying means configured to identify a target to be captured by a camera having a sensor mounted thereon;
   a distance measuring means configured to obtain a plurality of distance measurements based on data received from the sensor; and
   a determining means configured to determine, based on the plurality of distance measurements, whether the target is obscured by at least a part of an object within a field of view of the camera.

2. The video surveillance apparatus according to claim 1, wherein the determining means is configured to receive distance measurements from a plurality of sensors mounted on a plurality of cameras, and determine whether the target falls within the field of view of each of the plurality of cameras.

3. The video surveillance apparatus according to claim 1, wherein the determining means is configured to map the field of view of the camera.

4. The video surveillance apparatus according to claim 1, further comprising a display generating means configured to generate a display showing the field of view of the camera.

5. The video surveillance apparatus according to claim 4, wherein the display generating means generates a display showing the field of view of the camera as a plan view.

6. The video surveillance apparatus according to claim 1, comprising a target determination means configured to determine whether the target falls within the field of view of the camera.

7. The video surveillance apparatus according to claim 1, comprising an alert generation means configured to generate an alert if the target obscured by the object or if a time has elapsed since the target was last observed.

8. The video surveillance apparatus according to claim 1, further comprising:
   a locking signal generation means configured to generate a signal to lock a door if the target obscured by the object.

9. The video surveillance apparatus according to claim 1, wherein the sensor is capable of operating even if there is insufficient light for the camera to capture the target.

10. The video surveillance apparatus according to claim 1, further comprising:
    a light signal generation means configured to generate a signal to turn on lights to illuminate the target if the target obscured by the object.

11. The video surveillance apparatus according to claim 1, further comprising:
    a recording initiation means configured to start the recording of image data if the target is obscured by the object.

12. The video surveillance apparatus according to claim 1, wherein the distance measuring means is configured to periodically receive data from the sensor and obtain distance measurements and the determining means is configured to periodically determine, based on the plurality of distance measurements, whether the target falls within the field of view of the camera.

13. The video surveillance apparatus according to claim 1, wherein the identifying means is configured to identify the target by extracting, from a memory, location data of the target.

14. The video surveillance apparatus according to claim 1, wherein the object within the field of view of the camera is detected based on the plurality of distance measurements.

15. The video surveillance apparatus according to claim 6, comprising at least two cameras and an alert generation means configured to generate an alert if the target is not within the field of any of said two cameras or if a time has elapsed since the target was last observed by said two cameras.

16. The video surveillance apparatus according to claim 2, wherein the determining means is configured to map the field of view of each of the plurality of cameras.

17. The video surveillance apparatus according to claim 2, further comprising a display generating means configured to generate a display showing the field of view of each of the plurality of cameras.

18. The video surveillance apparatus according to claim 17, wherein the display generating means generates a display showing the field of view of each of the plurality of cameras as a plan view.

19. The video surveillance apparatus according to claim 2, comprising a target determination means configured to determine whether the target falls within the field of view of each of the plurality of cameras.

20. The video surveillance apparatus according to claim 19, comprising an alert generation means configured to generate if there are multiple cameras, an alert if the target is not within the field of view of any of the plurality of cameras.

21. The video surveillance apparatus according to claim 19, further comprising:

a locking signal generation means configured to generate a signal to lock a door, if the target is not within the field of view of any of the plurality of cameras.

22. The video surveillance apparatus according to claim 19, wherein the sensor is capable of operating even if there is insufficient light for the camera to capture the target.

23. The video surveillance apparatus according to claim 19, further comprising:
   a light signal generation means configured to generate a signal to turn on lights to illuminate the target, if the target is not within the field of view of any of the plurality of cameras.

24. The video surveillance apparatus according to claim 19, further comprising:
   a recording initiation means configured to start the recording of image data if the target is not within the field of view of any of the cameras.

25. The video surveillance apparatus according to claim 2, wherein the distance measuring means is configured to periodically receive data from the plurality of sensors and obtain distance measurements and the determining means is configured to periodically determine, based on the plurality of distance measurements, whether the target falls within the field of view of each of the plurality of cameras.

26. A method for determining whether a target is obscured by at least a part of an object within a field of view of a camera having a sensor mounted thereon, comprising:
   identifying a target to be captured by the camera;
   receiving data from the sensor;
   obtaining a plurality of distance measurements based on data received from the sensor; and
   determining whether the target is obscured by at least a part of an object within the field of view of the camera based on the plurality of distance measurements.

27. A non-transitory computer-readable medium having a computer program comprising computer readable instructions, which when run on a computer, causes the computer to carry out a method for determining whether a target is obscured by at least a part of an object within a field of view of a camera having a sensor mounted thereon, comprising:
   identifying a target to be captured by the camera;
   receiving data from the sensor;
   obtaining a plurality of distance measurements based on data received from the sensor; and
   determining whether the target is obscured by at least a part of an object within the field of view of the camera based on the plurality of distance measurements.

* * * * *